(12) United States Patent
Kirzhner

(10) Patent No.: US 6,848,193 B1
(45) Date of Patent: Feb. 1, 2005

(54) METHODS AND SYSTEMS FOR MACHINE MONITORING SYSTEM CALIBRATION

(75) Inventor: Joseph Dmitry Kirzhner, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/723,495

(22) Filed: Nov. 26, 2003

(51) Int. Cl.$^7$ .................... G01B 7/14; G01B 5/14
(52) U.S. Cl. ................. 33/833; 33/502; 33/655; 73/462
(58) Field of Search .............. 33/501.02, 501.03, 33/502, 542.1, 572, 613, 645, 655, 657, 702, 710, 833; 73/462

(56) References Cited

U.S. PATENT DOCUMENTS

| | | | |
|---|---|---|---|
| 4,063,167 A | | 12/1977 | Duly |
| 4,190,961 A | * | 3/1980 | James et al. .............. 33/502 |
| 4,238,960 A | * | 12/1980 | Curtis et al. .............. 73/462 |
| 4,484,474 A | * | 11/1984 | Maus .................... 73/462 |
| 4,765,472 A | * | 8/1988 | Dent .................... 206/373 |
| 4,818,948 A | * | 4/1989 | Dooley .................. 324/662 |
| 4,928,400 A | * | 5/1990 | Schuh ................... 33/833 |
| 5,099,430 A | * | 3/1992 | Hirsch .................. 73/462 |
| 5,201,224 A | * | 4/1993 | Rogers et al. ............ 73/462 |
| 5,649,369 A | * | 7/1997 | Thoren .................. 33/655 |
| 5,973,502 A | * | 10/1999 | Bailleul et al. .......... 324/662 |
| 6,062,078 A | * | 5/2000 | Meisberger .............. 73/462 |
| 6,401,460 B1 | | 6/2002 | Xia |
| 6,568,096 B1 | * | 5/2003 | Svitkin et al. .......... 33/501.02 |

* cited by examiner

Primary Examiner—G. Bradley Bennett
(74) Attorney, Agent, or Firm—William Scott Andes; Armstrong Teasdale LLP (57) ABSTRACT

A method of measuring a clearance distance between a first member and a stationary member is provided. The method includes measuring the clearance distance using a first probe that is removably coupled at least partially within a mounting adapter, determining a first probe calibration based on the measured clearance distance, measuring a gauge clearance distance using a second probe, and modifying the first probe calibration based on the gauge clearance distance.

33 Claims, 6 Drawing Sheets

METHODS AND SYSTEMS FOR MACHINE MONITORING SYSTEM CALIBRATION

BACKGROUND OF THE INVENTION

This invention relates generally to machine monitoring systems, and more particularly to a monitoring system calibration.

At least some known machines use capacitance probe-based clearance monitoring systems to measure member clearances. Specifically, one such monitoring system used in determining turbine blade tip clearance measurement uses a capacitance probe. To ensure the monitoring system is outputting correct clearance distance values, the monitoring system output may be periodically checked against a standard, such as, a calibration system of traceable accuracy characteristics. At least some known machines include rotating members that make access to portions of the monitoring system during machine operational conditions impracticable. Hence, the machine monitoring system may be calibrated during machine shutdown conditions. However, known calibration methods may introduce measurement inaccuracies related to characteristics inherent to a selected calibration probe measurement technology, to calibration probe placement in a different location than the monitoring system probe and/or to temperature expansion and rotational dynamics effects differences between the operating condition and the shutdown condition.

BRIEF DESCRIPTION OF THE INVENTION

In one aspect, a method of measuring a clearance distance between a first member and a stationary member is provided. The method includes measuring the clearance distance using a first probe that is removably coupled at least partially within a mounting adapter, determining a first probe calibration based on the measured clearance distance, measuring a gauge clearance distance using a second probe, and modifying the first probe calibration based on the gauge clearance distance.

In another aspect, a clearance measurement system for measuring a clearance distance between a first member and a stationary member is provided. The system includes a first probe comprising a measurement face that is sensitive to a proximity of the first member, the probe mountable in a mounting adapter, the mounting adapter coupled to a radially outer surface of the stationary member, an amplitude modulation clearance measurement circuit electrically coupled to the first probe, a second probe mountable in the mounting adapter.

In yet another aspect, a rotary machine is provided. The rotary machine includes a stationary member, a rotatable member that is rotatable at least partially within the stationary member, a mounting adapter mounted in an aperture extending though the stationary member and in communication with the rotatable member wherein the mounting adapter includes a locking member configured to alternately engage a first probe and a second probe wherein the first probe is of a different type than the second probe.

DETAILED DESCRIPTION OF THE INVENTION

Figure 1:
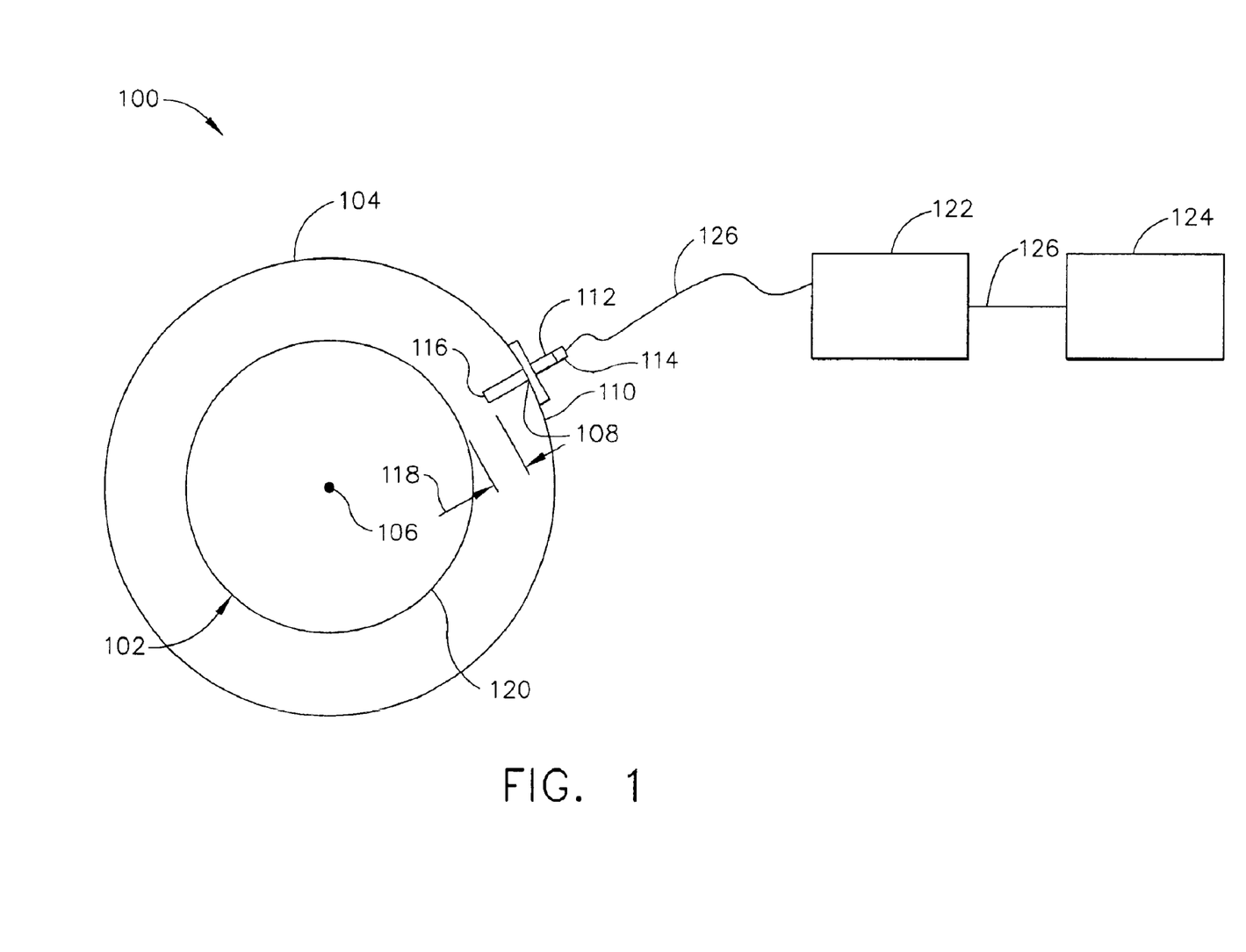
FIG. 1 is a perspective end view of an exemplary rotary machine.

FIG. 1 is a perspective end view of an exemplary rotary machine 100. In the exemplary embodiment, machine 100 is a gas turbine such as a Model 9H, or 9FA, commercially available from General Electric, Greenville, S.C. Machine 100 includes a rotatable member 102 and a stationary member 104. Rotatable member 102 may include radially extending members (not shown), such as, but not limited to turbine blades, and is configured to rotate about a longitudinal axis 106. Stationary member 104 includes at least one aperture 108 through a casing 110. In the exemplary embodiment, aperture 108 includes a mounting adapter 112. In an alternative embodiment, aperture 108 is threaded to receive a capacitance proximity probe 114 directly. Probe 114 extends radially inwardly through aperture 108 toward rotatable member 102. A sensing end 116 of probe 114 is positioned a predetermined distance 118 from an outer periphery 120 of rotatable member 102. Probe 114 is electrically coupled to an electronic control 122 and a computer 124 through one or more instrument cables 126 that may be joined together serially using one or more connectors and/or termination points (not shown). Electronic control 122 is further communicatively coupled to computer 124 to record, display, and process an output of electronic control 122. As used herein, the term computer is not limited to just those integrated circuits referred to in the art as processors, but broadly refers to computers, processors, microcontrollers, microcomputers, programmable logic controllers, application specific integrated circuits, PCs, distributed control systems (DCS) and other programmable circuits.

In operation, probe 114 receives an excitation signal from electronic control 122 such that sensing end 116 is capacitively coupled to objects positioned proximate sensing end 116. In one embodiment, probe 114 receives an amplitude modulated excitation signal. In an alternative embodiment, probe 114 receives a frequency modulated excitation signal. In the exemplary embodiment, probe 114 receives an amplitude modulated excitation signal and a frequency modulated excitation signal alternately depending on an operating condition of machine 100 that may include, but is not limited to, a rate of rotation of rotatable member 102.

Figure 2:
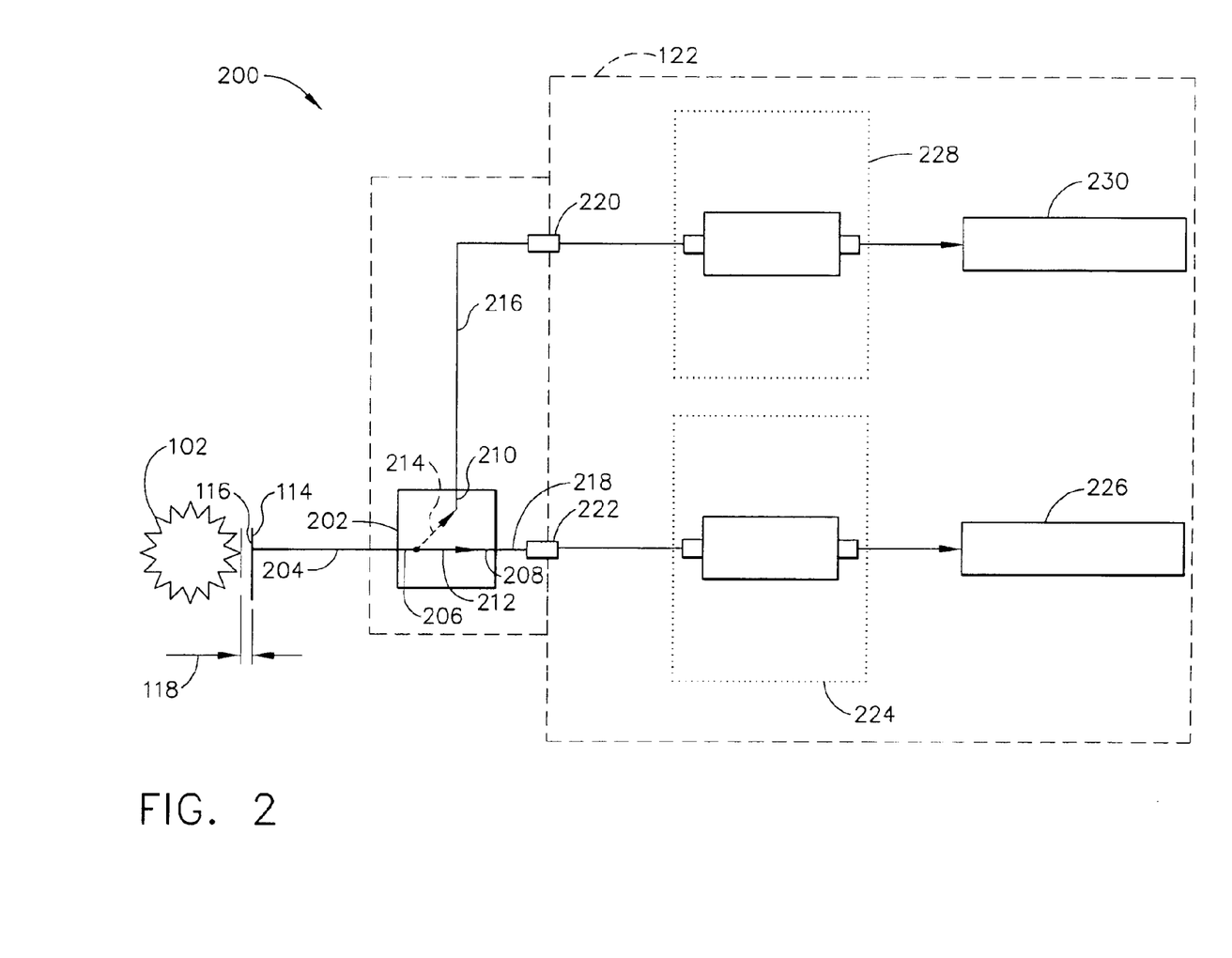
FIG. 2 is schematic diagram of an exemplary clearance measurement system that may be used with the rotary machine shown in FIG. 1.

FIG. 2 is schematic diagram of an exemplary clearance measurement system 200 that may be used with rotary machine 100 (shown in FIG. 1). System 200 includes probe 114 that is electrically coupled to a switch 202 through cable 204. Probe 114 is coupled in capacitive communication with rotatable member 102 and mounted to stationary member 104 (shown in FIG. 1). Switch 202 includes a common pole 206, a first pole 208 and a second pole 210, such that, in a first position 212, an electrical path is defined between common pole 206 and first pole 208, and in a second position 214, an electrical path is defined between common pole 206 and second pole 210. In the exemplary embodiment, switch 202 is an integral component of electronic control 122, mounted within a common enclosure. In an alternative embodiment, switch 202 is mounted separately from electronic control 122 and is electrically coupled through cables 216 and 218 to electronic control 122 through panel connectors 220 and 222, respectively. First pole 208 is electrically coupled to a frequency modulating oscillator 224, which is further coupled to a frequency modulating (FM) measurement circuit. Second pole 210 is electrically coupled to an amplitude modulating (AM) oscillator 228, which is further electrically coupled to an amplitude modulating measurement circuit 230. In the exemplary embodiment, oscillator 228 and circuit 230 are mounted within electronic control 122 and is used in conjunction with switch 202 and oscillator 224 and circuit 226. In an alternative embodiment, electronic control 122 only includes oscillator 224 and circuit 226, and oscillator 228 and circuit 230 are housed in a separate enclosure, and are used instead of oscillator 224 and circuit 226 to excite probe 114 and receive signals from probe 114. In the exemplary embodiment, switch 202 is automatically selectable based on the operating condition of machine 10 (shown in FIG. 1). For example, switch 202 may be configured to select first position 212 when the rate of rotation of rotatable member 102 is greater than a predetermined range, such as approximately five-hundred RPM. At a rate of rotation less than five-hundred RPM switch 202 may select second position 214. Accordingly, switch 202 may be a relay or other switching device that may be controlled from a user's separate control system and/or other logic or processing device. In an alternative embodiment, switch 202 is configured to be manually selectable between first position 212 and second position 214. The selection is configured to be made through the use of a user control system (not shown) but, may be configured such that the selection is made directly manually at switch 202. Although system 200 is illustrated having only one probe 114, system 200 may include a plurality of probes 114 spaced apart along stationary member 104 such that predetermined areas of interest are monitored during all operating conditions of machine 100. System 200 may also include a respective plurality of oscillators and measurement circuits coupled to the plurality of probes 114.

In operation, oscillator 228 and circuit 230 are electrically coupled to probe 114 through switch 202. System 200 may be calibrated using a calibration station (not shown). Calibration constants are determined from the calibration and are entered into circuits 226 and 230. Oscillator 228 and circuit 230 may be activated to sense a position of rotatable member 102. Rotatable member 102 is then rotated manually to position an area of interest proximate sensing end 116. Distance 118 is measured mechanically using a depth micrometer or other measuring means. The mechanically measured distance 118 is compared to distance 118 measured by system 200 and further calibration coefficients are determined and entered into circuits 226 and 230. During a procedure for aligning the position of rotatable member 102 within stationary member 104, the clearance distance between rotatable member 102 and stationary member 104 is determined using probe 114 that is excited with the first modulation signal and the position of rotatable member 102 with respect to stationary member 104 is adjusted using the measured clearance distance. In the exemplary embodiment, only one probe and associated electronic circuits are shown, but it is anticipated that a plurality of probes and associated electronics may be used to determine clearances at a plurality of points spaced about rotatable member 102 and stationary member 104. By comparing clearance distances at a plurality of measurement points, a relative position and orientation of rotatable member 102 within stationary member 104 may be determined. The position and orientation of rotatable member 102 within stationary member 104 may be adjusted to match a predetermined position and orientation to facilitate aligning rotatable member 102 within stationary member 104. At startup of machine 10, second position 214 is selected to measure machine cold clearances using AM oscillator 228 and AM circuit 230. System 200 monitors clearances of rotatable member 102 with respect to stationary member 104 as rotatable member increases its rate of rotation using AM oscillator 228 and measurement electronics 230 until a predetermined range of the rate of rotation is reached, for example, five-hundred RPM. Switch 202 is switched to first position 212 wherein excitation for probe 114 comes from FM oscillator 224 and the output of probe 114 is transmitted to circuit 226. Other operating conditions of machine 100 may also be used to determine the position of switch 202. The clearance distance that is measured just prior to switch 202 switching from position 214 to position 212 is compared to the clearance distance that is measured just after switch 202 is switched from position 214 to position 212. The clearance distance being measured just prior to switching is being measured by AM oscillator 228 and measurement electronics 230. The clearance distance being measured just after switching is being measured by FM oscillator 224 and measurement electronics 226. A clearance distance difference greater than a predetermined range may indicate a measurement error. System 200 may use the difference to modify calibration constants in measurement circuits 226 and 230 to correct the clearance measurement and/or may signal an alarm indicating a potential error to an operator or a supervisory control system. In the exemplary embodiment, measurement electronics circuits 226 and 230 each comprise a capacitance displacement transducer (CDT) amplifier that transmits a 0–10 $V_{dc}$ capacitance signal which is fed to a 1/V precision converter to output a linear clearance signal over the range 0.1–10 $V_{dc}$ to computer 124. Computer 124 includes data acquisition hardware and executes data acquisition software.

Figure 3:
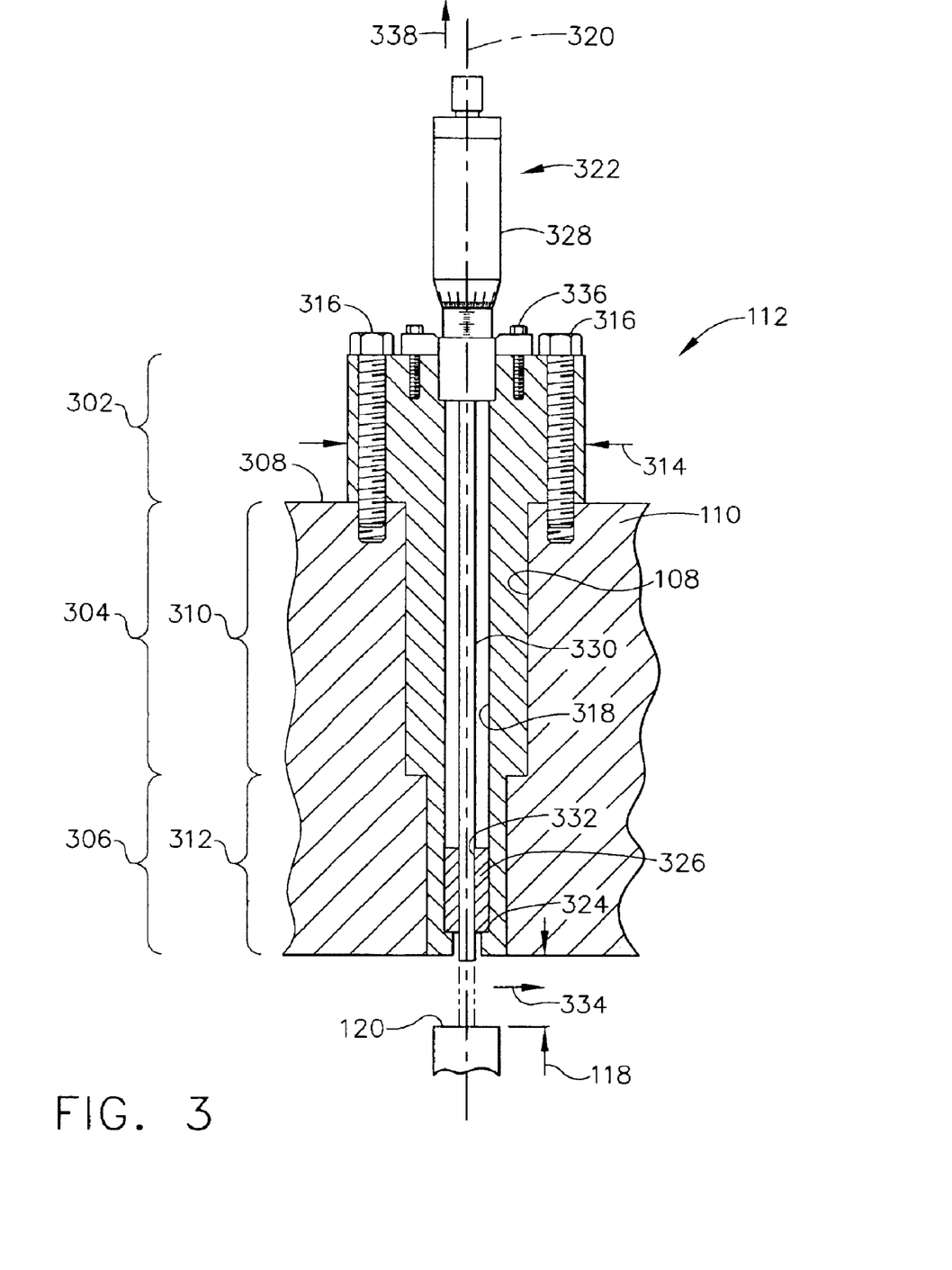
FIG. 3 is a detailed side perspective view of an exemplary embodiment of the mounting adapter shown in FIG. 1.

FIG. 3 is a detailed side perspective view of an exemplary embodiment of mounting adapter 112 (shown in FIG. 1). In the exemplary embodiment, adapter 112 includes a mounting portion 302, an outer casing portion 304 and an inner casing portion 306. Mounting adapter 112 is configured to be slidably received in aperture 108 through casing 110. In an alternative embodiment, mounting adapter 112 is threadably received in aperture 108. Aperture 108 includes a radially outer portion 310 and a radially inner portion 312 that correspond to portion 304 and portion 306 respectively. Mounting portion 302 is configured to couple to a radially outer surface 308 of casing 110. In the exemplary embodiment, mounting portion 302 includes an outside diameter 314 that is greater than an inner diameter of portion 310. In the exemplary embodiment, mounting adapter 112 is coupled to surface 308 using at least one threaded fastener 316, such as a hex-head bolt. In an alternative embodiment, other coupling methods may be used, such as, but not limited to, pinning, riveting, welding and brazing.

Mounting adapter 112 includes an aperture 318 substantially centered along a mounting adapter longitudinal axis 320. Aperture 318 is sized to receive probe 114 (not shown in FIG. 3) and a calibration probe 322. In the exemplary embodiment, probe 322 is a depth micrometer gauge. In an alternative embodiment, probe 322 may be another mechanical probe type or may be an electrically excited probe. Aperture 318 also includes a portion of reduced inner diameter forming an aperture shoulder 324, which is sized to retain a rod guide sleeve 326 within aperture 318. In the exemplary embodiment, probe 322 includes a gauge body 328 and a gauge rod 330 that is extendable from gauge body 328. Rod guide sleeve 326 includes an aperture 332 that is substantially co-aligned with longitudinal axis 320.

In operation, mounting adapter 112 is coupled to surface 308 and includes probe 114 positioned at least partially within aperture 318. During a calibration procedure probe 114 may be used to determine clearance distance 118 between periphery 120 and casing 110. Probe 114 may yield a clearance distance value that is offset from an actual clearance distance value due to electrical changes in probe 114, conduit 126, and/or control 122. Mechanical changes to member 102, member 104, and/or mounting adapter 112 may affect the clearance distance value reading due to computational constants and/or assumptions in control 122 that over time are no longer accurate. Probe 114 may be removed from mounting adapter 112 and a traceable calibration probe 322 may be substituted in place of probe 114. A clearance distance value determined by probe 322 may be used to modify the computational constants and/or assumptions in control 322 such that when probe 114 is replaced into mounting adapter 112, the clearance distance value determined using probe 114 is accurate relative to an actual clearance distance value.

To facilitate accurate measurement of clearance distance 118 using probe 322, rod guide sleeve may be inserted into aperture 318 and slid into a predetermined position engaged with shoulder 324. When probe 322 is positioned within adapter 112, gauge rod 330 is slidably received within aperture 332, such that a movement of gauge rod 330 in a direction 334 that is perpendicular to axis 320 is substantially prevented. To further facilitate accurate measurement of clearance distance 118, adapter 112 may be fabricated such that an axial length of each portion 302, 304, and 306 matches a respective predetermined length. Additionally a locking mechanism 336 may be used to facilitate preventing a movement of probe 322 in a direction 338 that is parallel to axis 320.

Figure 4:
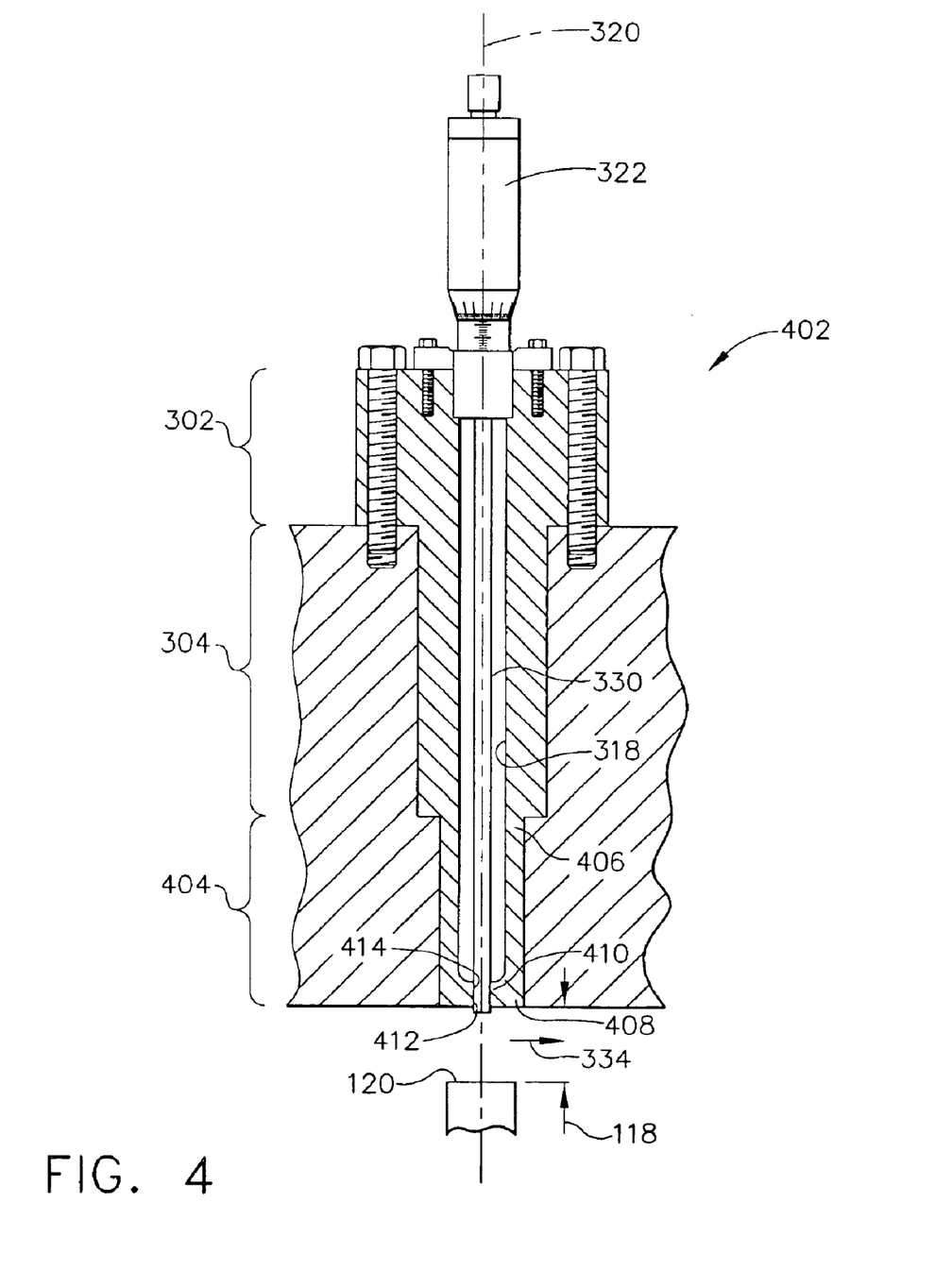
FIG. 4 is a detailed side perspective view of an exemplary mounting adapter that may be used with the machine shown in FIG. 1.

FIG. 4 is a detailed side perspective view of an exemplary mounting adapter 402 that may be used with machine 100 (shown in FIG. 1). Mounting adapter 402 is substantially similar to mounting adapter 112 (shown in FIG. 3) and components in Mounting adapter 402 that are identical to components of Mounting adapter 112 are identified in FIG. 4 using the same reference numerals used in FIG. 3. Accordingly, in one embodiment, mounting adapter 402 includes mounting portion 302, outer casing portion 304, inner casing portion 404, and aperture 318 therethrough. Inner casing portion includes first end 406 that is proximate outer casing portion 304, and a radially inner end 408. Inner end 408 includes a rod guide portion 410 that is circumferential about an inner diameter of inner end 408 and extends inwardly toward longitudinal axis 320. Rod guide portion 410 includes an aperture 412 therethrough wherein the inner diametric surface of aperture 412 defines a rod guide surface 414. Rod guide surface 414 is sized to facilitate reducing movement of gauge rod 330 in direction 334.

Figure 5:
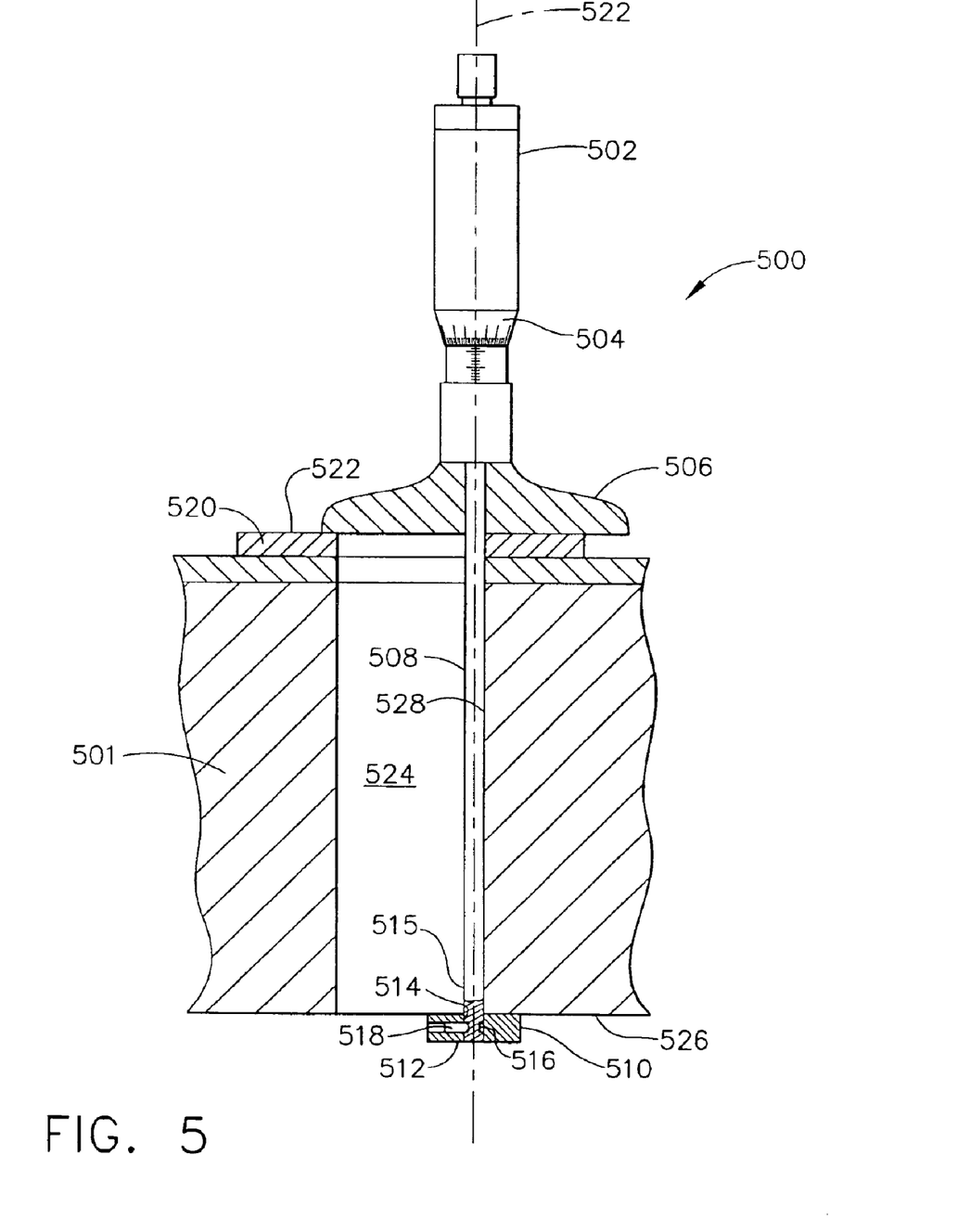
FIG. 5 is a perspective view of a probe configured to measure a thickness value of a machine casing.

FIG. 5 is a perspective view of a probe 500 configured to measure a thickness value of a machine casing 501. In the exemplary embodiment, probe 500 includes a body 502, a graduated sleeve 504 for reading casing thickness values. In the exemplary embodiment, the graduated sleeve 504 is a vernier scale. In an alternative embodiment, graduated sleeve 504 is a digital display, such as, but not limited to an LCD display. Probe 500 includes a stock 506 for stabilizing probe 500 in a measurement position and a gauge rod 508 coupled to body 502, such that gauge rod 508 may be extended longitudinally to an extended position (not shown) and an engaged position shown in FIG. 5. To facilitate positioning gauge rod 508 in the engaged position, gauge rod 508 includes a hook 510. In the exemplary embodiment, hook 510 includes a cylindrical body 512 that includes an aperture 514. A distal end 515 of gauge rod 508 may include a circumferential groove 516 that is configured to receive a locking device 518, such as, but not limited to a set screw and a biased detent. In one embodiment, hook 510 is unitarily formed with gauge rod 508. Positioning of stock 506 may be facilitated by a spacer 520 to provide a surface 522 that is substantially orthogonal to a longitudinal axis 523.

In operation, gauge rod 508 is extended to a predetermined position based on an approximation of a thickness of casing 501. Gauge rod 508 may be inserted though an aperture 524 in casing 501 such that hook 510 extends to a radially inner casing surface 526 and positioned wherein hook 510 engages radially inner casing surface 526 and gauge rod 508 is proximate a sidewall 528 of aperture 524. Gauge rod 508 may be extended or retracted such that a reading of graduated sleeve 504 represents at least one component of the casing thickness measurement.

Figure 6:
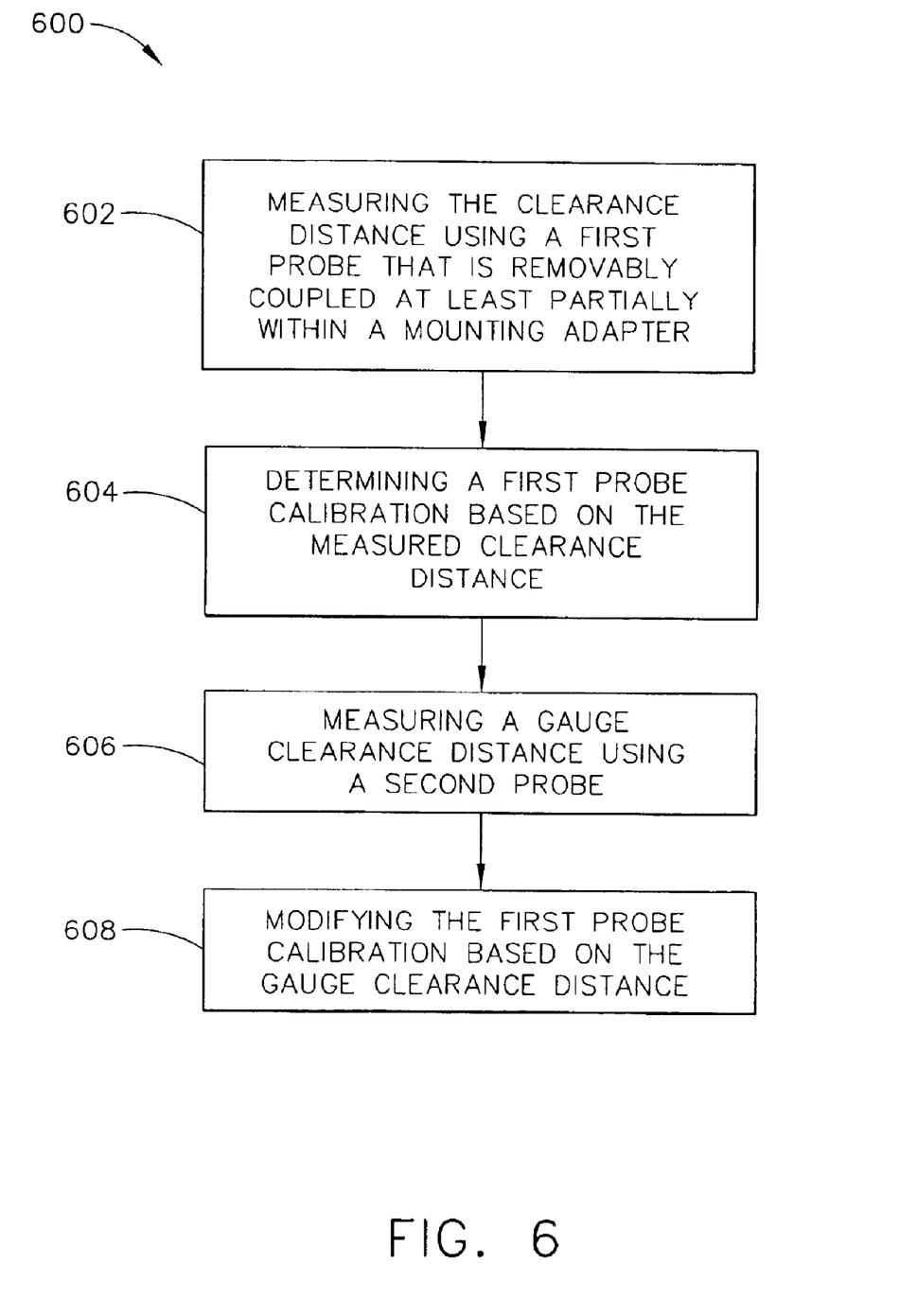
FIG. 6 is a block diagram of an exemplary method of measuring a clearance distance between a first member and a stationary member that may be used with the system shown in FIG. 2.

FIG. 6 is a block diagram of an exemplary method 600 of measuring a clearance distance between a first member and a stationary member that may be used with system 200 (shown in FIG. 2). Method 600 includes measuring 602 the clearance distance using a first probe that is removably coupled at least partially within a mounting adapter. In the exemplary embodiment, the first probe is a capacitance type probe that is excited with an amplitude modulated (AM) signal. The first probe may be positioned within a mounting adapter that is configured to lockably coupled the probe into the mounting adapter such as by a biased twist-engagement. A first probe calibration may be determined 604 based on the measured clearance distance. Calibration constants are determined from the measured clearance distance and are entered into system 200. The first probe may be removed and replaced with a second probe, such as, a depth micrometer gauge that is configured to be received at least partially within the mounting adapter and to be lockably coupled into the mounting adapter, such as, by a biased twist-engagement. A gauge clearance distance value may be determined 606 using the second probe such that the gauge clearance distance value is facilitated being an accurate reading of the gauge clearance distance by using a second probe of traceable accuracy characteristics. The first probe calibration may be modified 608 based on the gauge clearance distance.

The above-described machine clearances measurement system is cost-effective and highly reliable for facilitating calibration of a clearance measurement system, for checking the circuit continuity and operational readiness of the measurement system, and for determining machine casing thickness. Specifically, a mounting adapted is configured to support a plurality of measurement probes to facilitate reducing calibration errors due to different mounting and positioning configurations of monitoring probes and calibration probes. As a result, the methods and apparatus described herein facilitate more accurate monitoring of rotating machinery at reduced labor costs in a cost-effective and reliable manner.

Exemplary embodiments of machine clearances calibration systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of measuring a clearance distance between a first member and a stationary member, said method comprising:
   measuring the clearance distance using a first probe that is removably coupled at least partially within a mounting adapter;
   determining a first probe calibration based on the measured clearance distance;
   measuring a gauge clearance distance using a second probe; and
   modifying the first probe calibration based on the gauge clearance distance.

2. A method in accordance with claim 1 wherein measuring a gauge clearance distance using a second probe comprises measuring a gauge clearance distance using a second probe that is removably coupled at least partially within the mounting adapter.

3. A method in accordance with claim 1 wherein measuring the clearance distance comprises measuring the clearance distance using an electrically-excited probe.

4. A method in accordance with claim 3 wherein measuring the clearance distance using an electrically-excited probe comprises measuring the clearance distance using a capacitance probe.

5. A method in accordance with claim 4 wherein measuring the clearance distance using a capacitance probe comprises measuring the clearance distance using an amplitude modulation excited capacitance probe.

6. A method in accordance with claim 1 wherein measuring a gauge clearance distance using a second probe comprises measuring the gauge clearance distance using a mechanical probe.

7. A method in accordance with claim 6 wherein measuring the gauge clearance distance using a mechanical probe comprises measuring the gauge clearance distance using a depth micrometer gauge.

8. A method in accordance with claim 7 wherein the gauge includes a gauge body and a gauge rod that is extendable from the gauge body, wherein measuring the gauge clearance distance using a depth micrometer gauge comprises extending the gauge rod to contact the rotatable member.

9. A method in accordance with claim 8 wherein extending the gauge rod to contact the rotatable member comprises extending the gauge rod through a removable guide sleeve.

10. A method in accordance with claim 9 wherein extending the gauge rod through a removable guide sleeve comprises extending the gauge rod through a removable guide sleeve such that a gauge rod movement in a direction that is perpendicular to a gauge rod longitudinal axis is substantially prevented.

11. A method in accordance with claim 1 further comprising:
   removing the first probe from the mounting adapter;
   zeroing a position of the second probe with respect to a measurement scale; and
   inserting the second probe into the mounting adapter such that at least a portion of the second probe passes through a guide sleeve wherein the guide sleeve is substantially axially co-aligned with respect to the mounting adapter.

12. A method in accordance with claim 11 wherein the second probe is a depth gauge, the depth gauge includes a gauge body and a gauge rod that is extendable from the gauge body, the method further comprising lockably coupling the second probe into the mounting adapter such that a gauge body movement in a direction that is parallel to a gauge rod longitudinal axis is substantially prevented.

13. A method in accordance with claim 1 wherein the second probe includes a gauge body and a gauge rod that is extendable from the gauge body, wherein measuring a gauge clearance distance using a second probe comprises measuring a gauge clearance distance such that the gauge rod extends through an aperture of the mounting adapter, the aperture including a rod guide surface.

14. A method in accordance with claim 13 wherein measuring a gauge clearance distance comprises extending the gauge rod through an aperture of the mounting adapter such that a gauge rod movement in a direction that is perpendicular to a gauge rod longitudinal axis is substantially prevented.

15. A method in accordance with claim 13 wherein measuring a gauge clearance distance comprises extending the gauge rod through a mounting adapter aperture that is substantially axially co-aligned with respect to the mounting adapter.

16. A method in accordance with claim 1 wherein the stationary member is a casing of a rotary machine, wherein measuring a gauge clearance distance using a second probe comprises measuring a thickness of the casing using the second probe.

17. A method in accordance with claim 16 wherein the second probe includes a body and a gauge rod that is extendable from the body wherein measuring a thickness of the casing using the second probe comprises:
   determining a casing radially inner surface position relative to a predetermined probe reading;
   determining a casing radially outer surface position relative to the predetermined probe reading; and
   determining the casing thickness from the determined casing inner and outer positions.

18. A method in accordance with claim 17 wherein a distal end of the gauge rod includes a surface normal to a longitudinal axis of the gauge rod wherein determining a casing radially inner surface position comprises:
   inserting a distal end of the gauge rod through an aperture in the casing; and
   mating the normal surface of the gauge rod to the casing radially inner surface; and
   noting a position reading of the second probe.

19. A clearance measurement system for measuring a clearance distance between a first member and a stationary member, said system comprising:
   a first probe comprising a measurement face that is sensitive to a proximity of said first member, said probe mountable in a mounting adapter, said mounting adapter coupled to a radially outer surface of the stationary member;
   an amplitude modulation clearance measurement circuit electrically coupled to the first probe; and
   a second probe mountable in the mounting adapter.

20. A clearance measurement system in accordance with claim 19 wherein said first member is rotatable about a longitudinal axis.

21. A clearance measurement system in accordance with claim 19 wherein said first member and said stationary member are substantially axially co-aligned.

22. A clearance measurement system in accordance with claim 19 wherein said first member is a turbine rotor assembly.

23. A clearance measurement system in accordance with claim 19 wherein said first probe is a capacitance probe.

24. A clearance measurement system in accordance with claim 19 wherein said second probe is a depth gauge, said depth gauge includes a gauge body and a gauge rod that is extendable from said gauge body.

25. A clearance measurement system in accordance with claim 24 wherein said second probe is configured to lockably couple into said mounting adapter such that a gauge body movement in a direction that is parallel to a gauge rod longitudinal axis is substantially prevented.

26. A clearance measurement system in accordance with claim 19 wherein the stationary member includes a radially outer casing, said system comprises a probe that includes a rod distal end hook that is configured to engage a radially inner surface of the casing.

27. A clearance measurement system in accordance with claim 26 wherein said rod distal end hook comprises a body comprising:

an aperture therethrough; and an engagement surface that is configured to engage a radially inner surface of the casing.

28. A clearance measurement system in accordance with claim 27 wherein said gauge rod distal end comprises a circumferential groove that is configured to engage at least a portion of said rod distal end hook.

29. A clearance measurement system in accordance with claim 19 wherein said mounting adapter comprises:

an aperture therethrough, said aperture comprises a first inner diameter and a second inner diameter, an interface between said first and second diameters comprising a shoulder;

a rod guide sleeve comprising an aperture therethrough, said aperture configured to receive a gauge rod, said rod guide sleeves sized to be slidably received within said first diameter and sized to engage said shoulder.

30. A rotary machine comprising:

a stationary member;

a rotatable member, rotatable at least partially within said stationary member; and a mounting adapter mounted in an aperture extending though said stationary member and in communication with said rotatable member, said mounting adapter comprising a locking member configured to alternately engage a first probe and a second probe, said first probe being of a different type than said second probe.

31. A rotary machine in accordance with claim 30 wherein said first probe comprises a capacitance probe configured to receive an excitation signal and to generate an output signal relative to a proximity of said rotatable member to a measurement face of said probe.

32. A rotary machine in accordance with claim 31 wherein said probe is configured to receive a frequency modulated excitation signal.

33. A rotary machine in accordance with claim 31 wherein said second probe is a depth gauge micrometer.

* * * * *